Sept. 20, 1955 W. P. BURRELL ET AL 2,718,356
DATA CONVERSION SYSTEM
Filed April 29, 1952 7 Sheets-Sheet 1

INVENTOR
W. P. BURRELL
A. A. COHEN
G. A. HARDENBERGH

BY Cushman, Darby & Cushman
ATTORNEYS

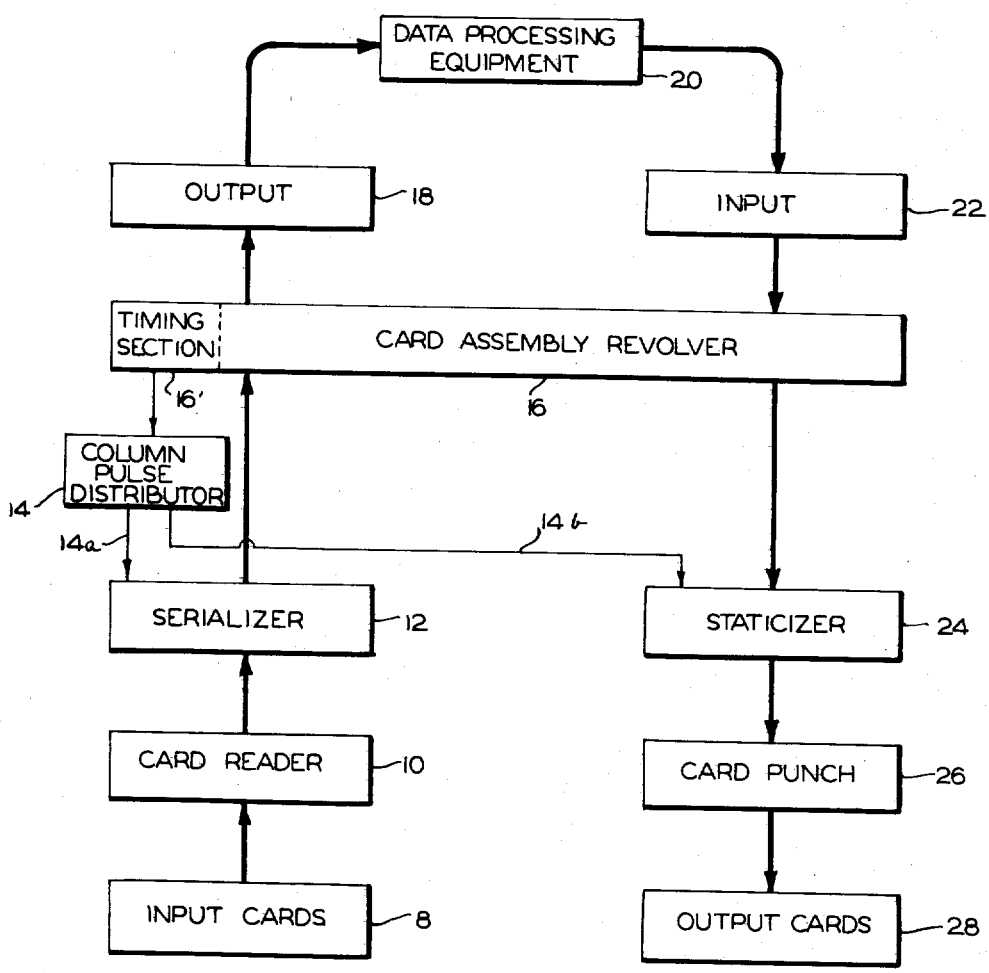

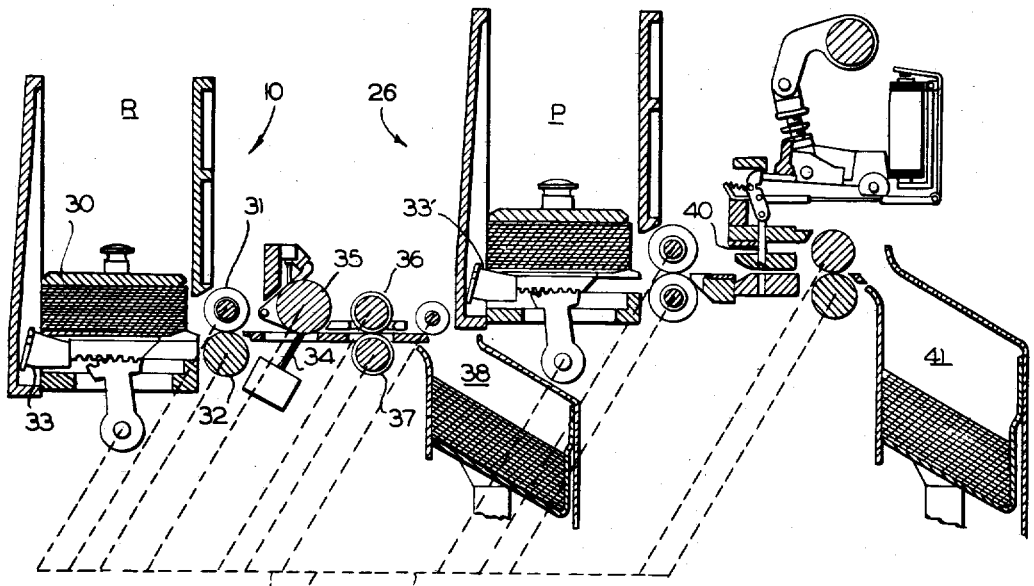
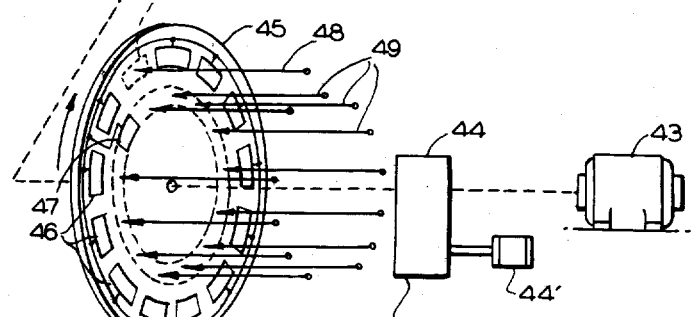

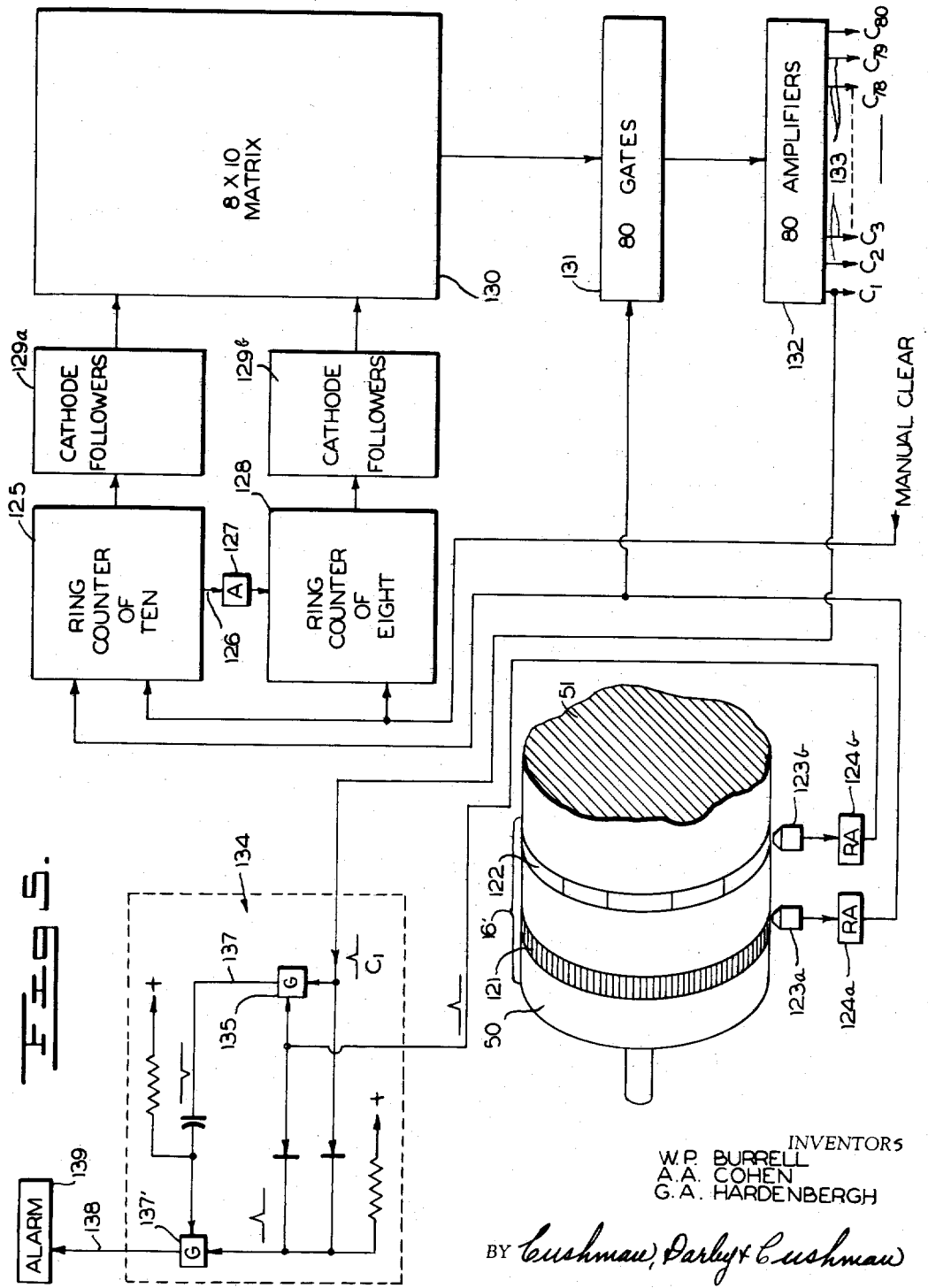

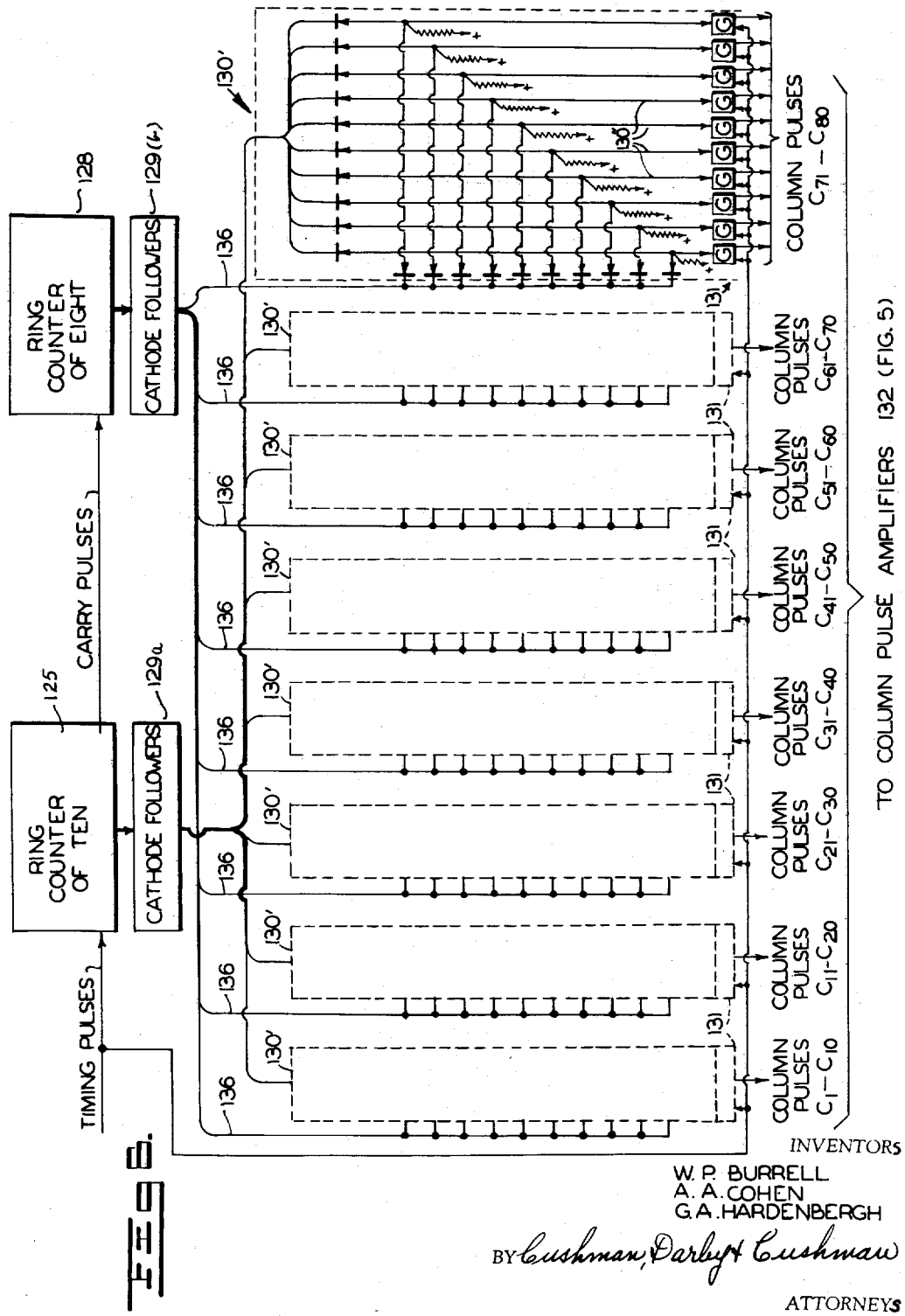

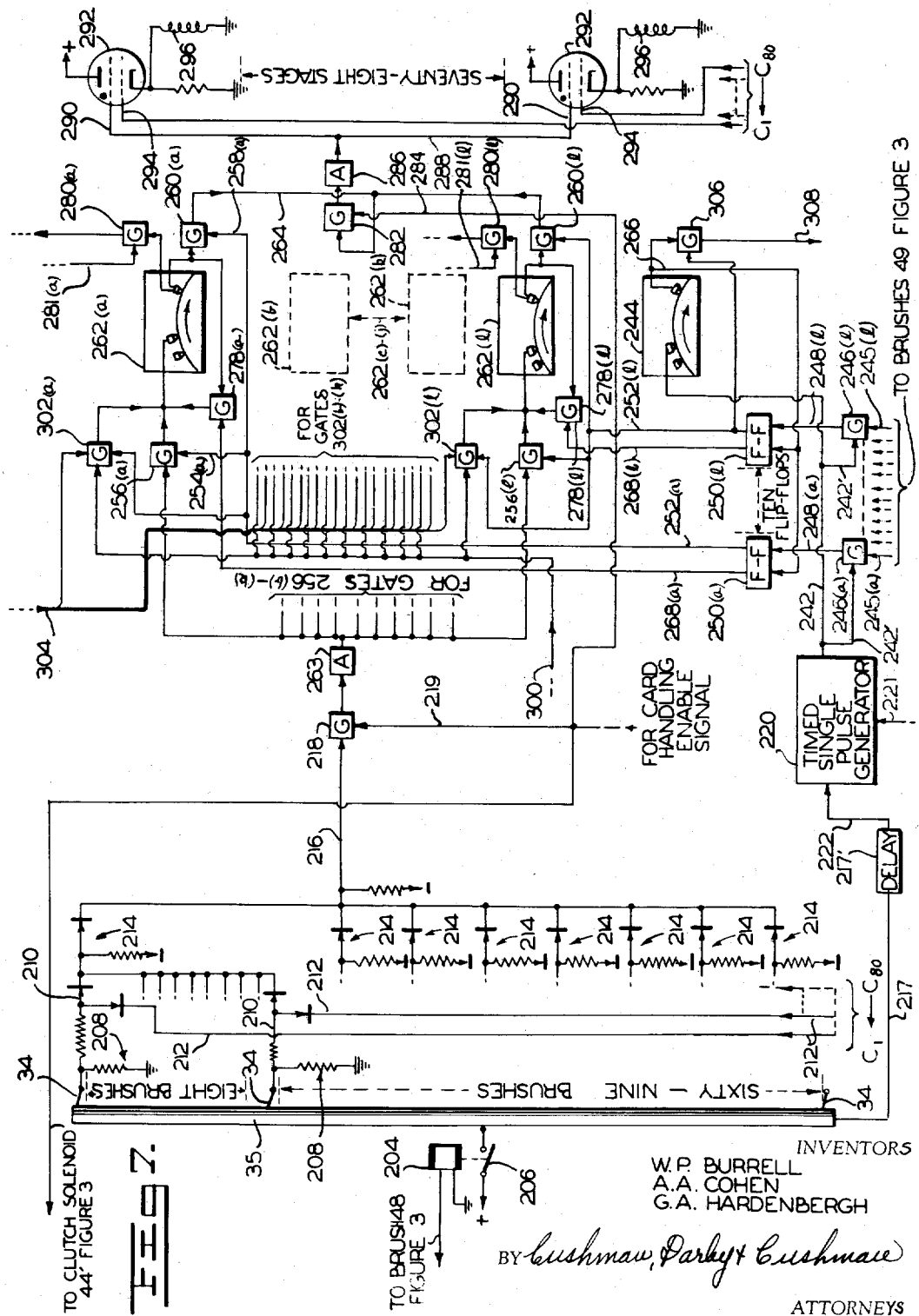

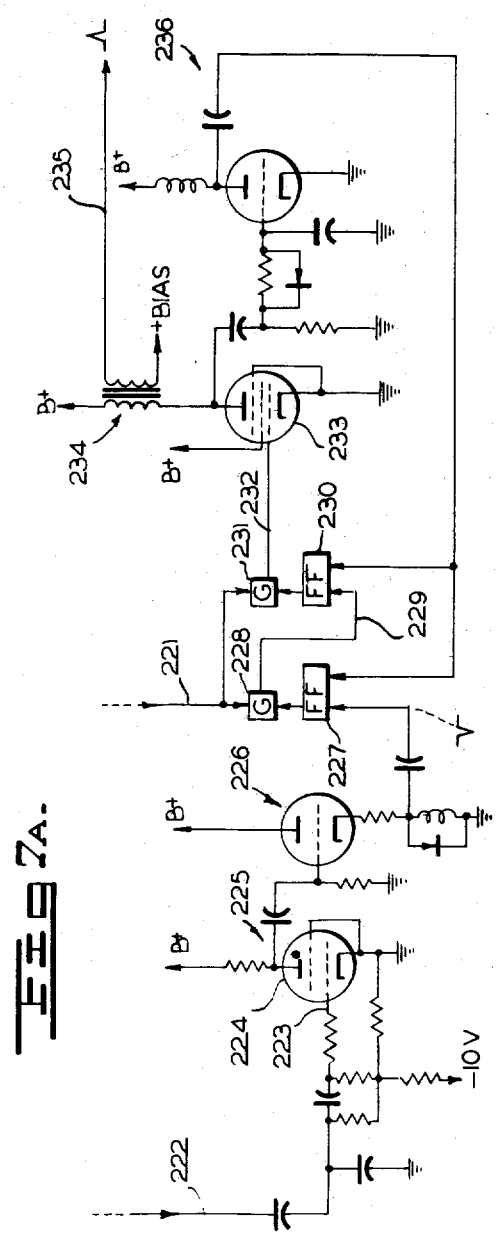

United States Patent Office 2,718,356
Patented Sept. 20, 1955

2,718,356

DATA CONVERSION SYSTEM

Warren P. Burrell and Arnold A. Cohen, Minneapolis, and George A. Hardenbergh, St. Paul, Minn., assignors, by mesne assignments, to International Business Machines Corporation, New York, N. Y., a corporation of New York Application April 29, 1952, Serial No. 284,914

32 Claims. (Cl. 235—61.6)

This invention relates to data conversion apparatus and particularly to such apparatus for converting data from a form such as punched card form to magnetic flux form on the surface of a magnetizable member.

A primary use for the present invention may be in connection with record controlled accounting and computing machines, and the present disclosure will relate the use of the invention to such apparatus, but without limitation to such use. The employment of punched record cards to provide the input and output means for record-controlled accounting and computing machines is well known. Card processing machines, because of their flexibility, are used in a wide variety of present-day accounting systems. Such machines customarily employ data storage and processing devices in the form of electromechanical counters and relay units, which are satisfactory for most purposes but which may be found unsuitable in other situations due to limitations in their storage capacity and speed of operation. On the other hand, there have been developed recently in the computer art various data storage devices of the magnetic flux type which are characterized by large storage capacity and rapid access to data, and which are more adaptable to so-called high-speed computing operations than are the prior forms of data storage devices, but the new data processing techniques utilizing these magnetic flux devices have not been proposed generally for use in commercial accounting and computing machines wherein record cards are employed to supply the input data to the equipment and accept output data therefrom. Consequently, there is at the present time a need for some practical form of data conversion apparatus which will enable data to be entered from record cards into storage means of the magnetic flux type and to be read out therefrom to a conventional recording means such as a card punch.

Accordingly, it is a primary object of this invention to provide apparatus for converting data borne by record cards (for example, perforated cards of the well known "IBM" type) into magnetic flux form as represented by a pattern of flux spots or cells in the surface of a magnetizable medium, and for converting data in magnetic flux form into the equivalent representations on record cards, so that the advantages of magnetic recording techniques can be realized in the operations of card-controlled accounting and computing machines.

It is a further object of this invention to provide apparatus for forming magnetic flux patterns as in the preceding object, wherein the magnetizable medium continuously moves and magnetic reading and recording means are arranged to cause the data to "revolve" or "circulate" through an electrical circuit.

Further objects and the entire scope of the invention will become further apparent from the following detailed description and from the appended claims.

In United States Patent 2,540,654, patented February 6, 1951, by A. A. Cohen et al., there is described apparatus for recording magnetic spots or cells on the surface of an elongated magnetizable member which is adapted to be moved continuously and cyclically in relation to various magnetic transducing heads. As one of various embodiments therein discussed, the magnetizable member is in the form of magnetic tape which is wrapped tightly about the periphery of a rotatable drum. As an alternative, the member may be in the form of an endless belt running over two or more pulleys. That patent also describes not only how so-called binary magnetic spots, that is, spots having flux oriented in one of two possible directions, may be recorded upon, removed from and altered in the message or intelligence tracks of a drum, but it is also explained how additional tracks may be employed to locate specific spots or cells in the intelligence tracks as the drum rotates.

The invention which is described in this specification comes under the magnetizable drum techniques described in the above-cited patent. More specifically, this specification discloses how data contained on record cards may be scanned, converted to electrical impulses, and written in magnetic form in cells of a storage system utilizing a rotatable magnetic member. Also, the present specification discloses the reverse process wherein data in magnetic form is converted to electrical impulses, is assembled in the proper form, and the impulses serve to record data on cards in punched form or other form.

The invention may be further understood with reference to the accompanying drawings, in which:

Figure 2 shows a data flow diagram according to the present invention.

Figure 3 shows a diagrammatic arrangement for reading and punching cards according to the present invention.

Figure 4 shows an arrangement for recording, reading and circulating data between the surface of a magnetizable medium and electrical circuits.

Figure 5 shows a schematic diagram of a pulse generating circuit employed in connection with the present invention.

Figure 6 shows electrical circuits, including the details of a circuit matrix which is shown in block form in Figure 5.

Figure 7 shows a schematic diagram of circuits employed for collecting data from punched cards and assembling such data in the form of patterns of magnetic flux spots or cells on a magnetizable surface, and Figure 7A shows a schematic diagram of a pulse gating circuit shown in block form in Figure 7.

Figure 1:
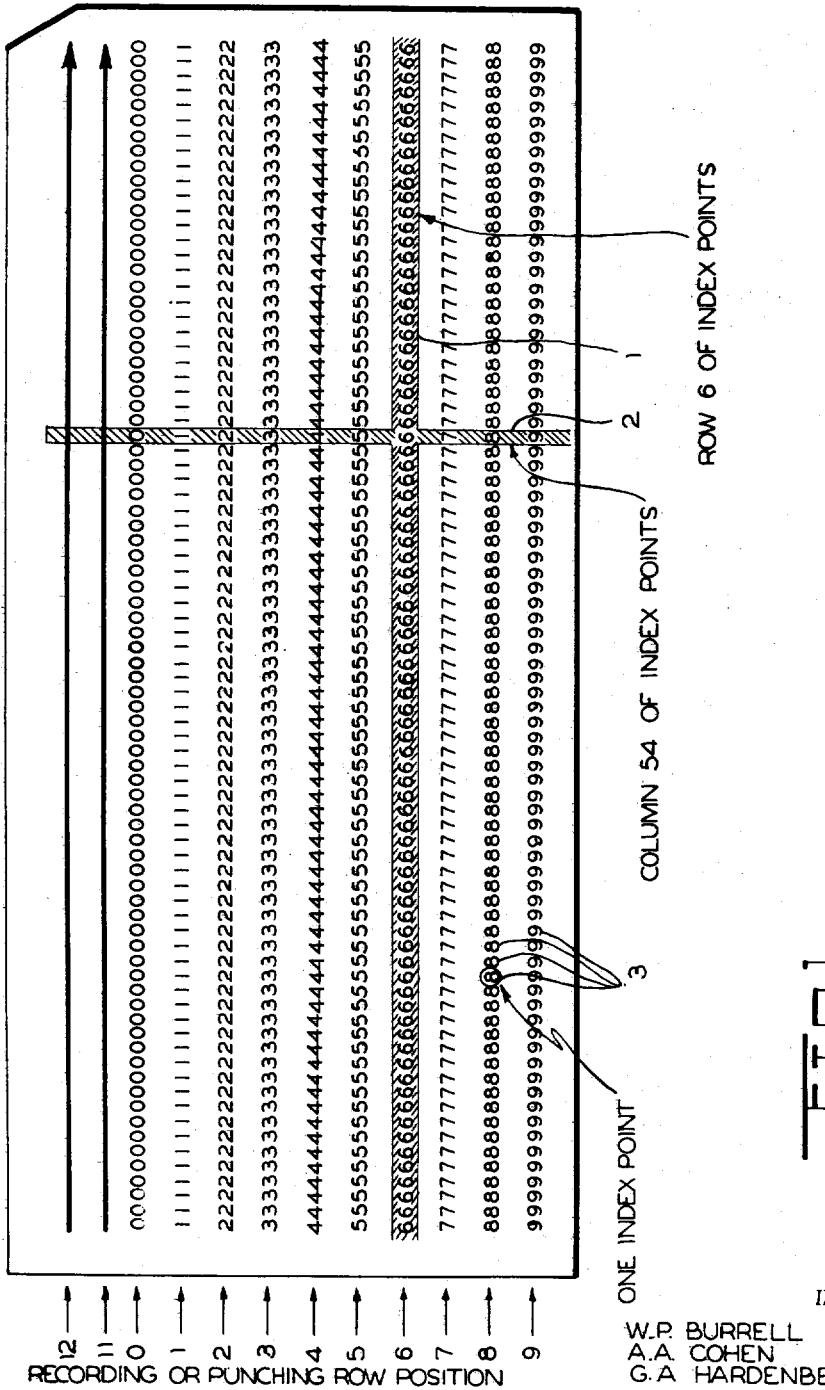
Figure 1 shows a diagrammatic representation of a well known IBM punched card.

Referring now to Figure 1, this shows a replica of a well known "IBM" punched record card having the dimensions of twelve recording positions, rows, or lines 1 by eighty vertical columns 2. Each of the eighty vertical columns is divided into twelve index points 3 of information, there being one index point 3 for each of the twelve recording positions. These features are further designated by legend in Figure 1. The printed matter on the card serves simply to aid in visually checking the information on the card, and is not necessary for proper functioning of the apparatus.

The general arrangement and operation of a preferred embodiment of the data conversion system will now be described with reference to Figure 2.

A supply of input record cards is diagrammatically designated as 8. This supply of cards is introduced into a card reader 10, one card at a time. Assuming, for purpose of illustration, that the cards are of the type shown in Figure 1, the card reader 10 may receive the input cards so that a row 1 of eighty of the index points 3 lies beneath a row of eighty feeler brushes, one for each index point. When the card is in position for reading each row, a serializer 12 will test each brush in time sequence to determine if an aperture exists at each index point 3. After one row is tested, the next row will be tested, and so on, until the complete card is processed.

The serial probing of index points is under the control of a column pulse distributor 14 which generates a series of discrete electrical pulses at predetermined times. Pulses for controlling the serializer 12 are available over a line 14a leading to the serializer.

The information generated at the serializer 12 is available as a series of pulses having a time occurrence dependent on the discovery of apertures along each row of eighty index points, this pulse information being applied in one or more tracks of a cyclically moving magnetizable member. This member will be referred to herein as a "card assembly revolver," for reasons which will become apparent as the description proceeds. The card assembly revolver, designated as 16, utilizes a portion of the surface of a drum or belt having a magnetizable surface. The pulse information may be recorded on the surface in accordance with techniques set out in the above mentioned Patent 2,540,654.

At the completion of the processing of a card in reader 10 and serializer 12 the arrangement is such that the complete card (or possibly only a portion thereof) is reconstituted in magnetic form in revolver 16.

The magnetizable member embodying the revolver 16 also has a portion designated 16' devoted to carrying means, which may be flux cells or spots, for generating the timing pulses available at the column pulse distributor 14.

When a card or portion thereof has been converted to magnetic form in revolver 16, this data is continuously available at a set of output terminals diagrammatically shown at 18. From output terminals 18 the data may go to data processing equipment designated as 20. In accordance with the present disclosure the data processing equipment may be the arithmetic section of a digital computer. However, the adaptability of the present invention for use with other types of equipment will become clear as the description proceeds.

Upon completion of the use of information in processing equipment 20, or upon availability of new or revised information at equipment 20 or any other source, such data may be applied to a set of revolver input terminals designated as 22, through which it may be inserted into revolver 16. Then, whenever it is desired to remove the data from the revolver, it may be reconverted to card form.

To convert data from magnetic form to card form the data is fed from the card assembly revolver 16 into a staticizer 24. This is a device which operates a card punch 26 to punch a supply of output cards 28. The staticizer 24 is also controlled by column pulse distributor 14 over a line 14b.

Normally, but not necessarily, data returned from the data processing equipment will be re-entered into the same track or tracks of the revolver from which it was originally delivered. Therefore, in such case, the revolver may be loaded with new data simultaneously with the removal of data.

A further description of the data conversion system will now be given in greater detail.

Reference is now made to Figure 3, which diagrammatically shows a representative embodiment of the structural arrangement of a card reading and punching apparatus.

Figure 3 of this application is taken primarily from the disclosure of the R. B. Johnson Patent 2,275,396, the disclosure of that patent being incorporated into this application for descriptive purposes. The Johnson patent further refers to the patent to C. D. Lake, Reissue 21,133, which serves to further explain the mechanism of the Johnson patent. Accordingly, the disclosure of the Lake patent is also intended to be incorporated into the present application for purposes of description.

In Figure 3, the card reader and card punch are designated generally as 10 and 26, respectively, to correspond with the illustration in Figure 2. The view in Figure 3 is an edgewise view partly in section based upon Figure 1 of the above-mentioned Johnson patent. In the card reader 10, it will be noted that a stack of the input cards 30 pass through a reader hopper R and are sequentially fed between feed rollers 31 and 32 by means of card picker 33. As each card progresses between the feed rollers 31 and 32, a complete row of eighty index points is sensed by an aligned row of feeler brushes 34. Wherever apertures are present along the row of index points, the feeler brushes 34 at each aperture will be able to extend through the apertures to contact a conductive roller 35 to complete an electric circuit in a manner to be described below. As the cards progress edgewise between the rollers 31 and 32, the leading edge of the card will be engaged by a second pair of feed rollers 36 and 37 before the trailing edge of the card leaves the first pair of feed rollers 31 and 32. The result is that each card is fed continuously past the feeler brushes 34. After the card leaves the second pair of feed rollers 36 and 37, it is dropped into a hopper 38.

The card punch 26 is similar in arrangement except that, in this instance, card punches rather than feeler brushes are provided. The cards are fed from a hopper P in this instance. The card punches are designated as 40 and again there is an aligned row of eighty punches. As is the case in the card reader 10, the cards move through the reader 26 under the action of first and second pairs of feed rollers and eventually the cards are dropped into a hopper 41.

The dash line 42 in Figure 3 designates schematically a mechanical drive to each of the various rollers, card pickers, and the like. A complete gear-train mechanism for this purpose may be understood with reference to the above mentioned Johnson and Lake patents. Normally, the driving equipment 42 will revolve the reader and punch through one cycle, during which a complete card may be processed, both in the reader 10 and punch 26, or in either unit alone. To carry out this operation a motor 43 is provided which drives the card reader and punch equipment through a one-revolution clutch 44. Attached to the output of clutch 44 in the mechanical drive 42 (for the purpose of the present invention) is a segmented commutator control or switching disc 45. Disc 45 is made of insulating material and is provided with an outer ring of embedded conductive segments 46 and an inner conductive segment 47. The outer ring of segments 46 carries twelve conductive segments and one blank or insulating segment 46'. Cooperating with the outer ring of segments 46 is a brush 48 and cooperating with the inner conductive segment 47 are a plurality of brushes 49.

In operation, the motor 43 will be energized to continuously revolve and upon energization of a clutch operating solenoid 44' (by circuits to be described below), the clutch 44 will engage and the disc 45 and the various movable components of the reader 10 and punch 26 will begin to move. The disc 45 will normally be at rest in the position shown in Figure 3: that is, the clutch 44 will disengage so that the blank segment 46' will be under the brush 48. As the disc begins to revolve clockwise, as viewed in Figure 3, the card pickers 33 and 33' of the reader 10 and punch 26, respectively, will feed the bottom card in each hopper into the first pair of feed rollers. As soon as the feed rollers have revolved a sufficient distance to place the first row of index points adjacent to the ends of the brushes 34 and punches 40, respectively (assuming a card is in both units), the brush 48 associated with disc 45 will contact the first of the conductive segments 46. This will complete an electric circuit between brush 48 and the segment 46 and this circuit will be employed to operate a relay to be described below. This sequence of events will continue as the brush 48 contacts one after another of the segments 46 and at the same time the cards will be moved correspondingly beneath the brushes 34 and punches 40.

The inner conductive segment 47 meanwhile will successively contact each of the brushes 49 associated with disc 45. The brushes 49 serve, through connection to circuits described below, to designate to certain electronic circuits just which of the rows of index points of the cards are under the brushes and/or punches.

As stated above, there are twelve conductive segments 46 and one blank segment 46'. The twelve conductive segments thus provide one segment for each row of the cards. It will furthermore be noted that the "leading" edge of segment 47 falls slightly behind what may be termed the leading edges of segments 46. That is, the brushes 49 will not engage segment 47 until brush 48 is already engaged with one of the segments 46. Accordingly, the circuits through brushes 49 will be made only during the intervals when the circuit is made through brush 48.

The card assembly revolver 16 will next be described in detail with reference to Figure 4. In this figure 50 represents the surface of a drum or belt according to the above mentioned Cohen et al. patent. (For convenience, but without limitation thereto, only drums will be referred to hereinbelow.) The drum, designated as 51, will be constantly rotated in the direction of arrow 52, which is clockwise as viewed in Figure 4.

The complete revolver may be made up of a plurality of side-by-side elements. Only one such element is seen in Figure 4. Each element of the revolver operates in conjunction with a track on the drum surface 50. The concept of drum tracks is fully explained in above mentioned Cohen et al. patent. (As will become fully apparent as this description proceeds, the complete card assembly revolver may operate in one track or a plurality of tracks.) Operating in the drum track is an erase transducer head 54, a write or recording transducer head 56, and a read or reproducing transducer head 58, together wtih associated circuitry, disposed along the drum track. The erase head 54 insures that a "clean" surface is presented to the write head 56. The write head 56 is used to insert information into the revolver system from one of three sources. The first of these sources has been discussed previously and is from the serializer 12. Another source of input is from the data processing equipment 20 which has been previously mentioned above. The third source of input is delivered from a recirculation path which will be discussed below.

The read head 58 is located "downstream" of the write head 56 and furnishes three outputs. The first of these is the output to the staticizer. Another is the output to the data processing equipment 20. The third output is provided to recirculation circuits to be described below.

The revolver element operates by accepting pulses which are recorded on surface 50 by write head 56. The maximum number of pulses which may be accepted is that number which, in relation to the speed of drum surface 50, will just fill the space on surface 50 between the write head 56 and the read head 58. That is, when the input is from the serializer 12, the speed of sampling of scanning eighty brushes 34 is just the time required for a pulse recorded at head 56 to be carried to the read head 58. Strictly speaking, the eighty pulse times referred to are "possible" pulse times, since normally less than all of the card index points will be apertured, and actual pulses will issue accordingly.

The read head 58 will read the recorded pulses and may recirculate the read pulses back to the write head 56 via recirculation path circuits 60. Therefore, the series of recorded pulses is continuously available at reading head 58 regardless of the diameter of the drum having surface 50. The revolution of the data through the just described system is the basis for use of the term "revolver" to describe this component. As will appear more fully below, since a complete card may be placed in revolver status, this component may be readily referred to as a card assembly revolver.

The next component which will be described is the column pulse distributor 14. The function of this component is to supply pulses for coordinating the revolver 16 with the serializer 12 and staticizer 24.

Referring now to Figure 5, there is shown a portion of the previously mentioned drum surface 50. This portion is contained within the timing section 16' of the card assembly revolver 16. Permanently recorded upon the timing section 16' are two tracks of magnetic marks, these being a timing track 121 and a boundary marker track 122. Reading heads 123(a) and 123(b) and reading amplifiers 124(a) and 124(b) convert these recorded pulses from magnetic form to electrical form. The recording and reading of these magnetic marks plus the general operation of a magnetic storage system may be as described in above-mentioned Patent 2,540,654.

By having the just-mentioned tracks located on the same drum as the previously described revolver track or tracks, synchronization is automatically established among all of the tracks.

In a typical system for this application, a drum speed of 1765 R. P. M. and a drum diameter of 16 inches may be used, with 800 magnetic marks permanently recorded around the periphery of the timing track 121, and with 10 boundary marker pulses furnished in the boundary marker track 122, these being spaced 80 pulse periods apart with respect to marks on the timing track 121. The boundary marker pulses are used to check alignment of the column pulse distributor equipment, as will become clear hereinbelow.

Marks on the timing track 121 are read by reading head 123(a), amplified by reading amplifier 124(a) and positive pulses are furnished to a ring counter-of-ten 125 and to an output gating circuit 131. The ring counter 125 may be of the type having a number of tube trigger circuits with only one of the triggers in the ring in ON status at any one time. The counter circuit is arranged in such a manner that when an advancing pulse is applied to all of the triggers, the next trigger beyond the one which is "on" will be turned ON by the preceding "on" trigger, with the latter being turned "off." This may be a ring counter as shown, for example, in the article by A. W. Burks entitled "Electronic computing circuits of the ENIAC," Proceedings of the Institute of Radio Engineers, vol. 35, pp. 757–760 (August 1947). Therefore, each timing pulse applied to the ring counter-of-ten 125 advances it one step. The carry from this counter 125 is applied to line 126 and its associated amplifier 127 and causes an advance of a ring counter-of-eight 128. The outputs of these two ring counters are applied through respective decoupling cathode followers 129(a) and 129(b) to an eight-by-ten matrix 130. A suitable eight-by-ten matrix which may be used is the one shown in Figure 6. The ten successive pulses from the ring counter-of-ten 125 successively "enable" each of the ten lines (extending vertically in Figure 6) of all of eight sub-matrices, each designated as 130'. Each of the eight sub-matrices is otherwise enabled in turn on lines 136 by the ring counter-of-eight. Therefore, by means of the 80 possible combinations of enable pulses to the matrix circuits from the ring counters, it is possible to produce eighty column pulses on eighty different lines 130". The eighty column pulses then furnish enabling signals to eighty gates 131. The successive enabling of these gates, which are of the two-input type, allows the passage of timing pulses to the eighty amplifiers 132, resulting in the production of eighty successive column pulses at the output. These eighty successive column pulses commence with column pulse eighty and proceed to the lower numbered column pulses, ending with column pulse one. In the drawings, the lines on which the respective column pulses will appear are designated $C_{80}$, etc.

Additional understanding of suitable matrix circuits may be had by reference to "Rectifier networks for multiposition switching," by D. R. Brown and N. Rochester, in the Proceedings of the Institute of Radio Engineers, vol. 37, No. 2, February 1949.

The alignment of the column pulse distributor is checked by comparing the output of column pulse one ($C_1$) with the output of the boundary marker track 122. Marks on the boundary marker track 122 are read by reading head 123(b), amplified by reading amplifier 124(b), and positive pulses are furnished to a circuit 134. If both the resultant positive output of boundary marker track 122 and the positive output of column pulse one on lead 133 are presented to a gate 135 at the same time, a negative pulse is produced on lead 137 which tends to close gate 137' and produces no output on lead 138. This is indicative of proper alignment and produces no actuation of an alarm mechanism 139. However, if due to some reason, the line carrying column pulse one ($C_1$) is energized and no output is present from the boundary marker track 122 and associated circuitry, gate 137' will permit the passage of a positive pulse to lead 138 and the actuation of alarm 139. A similar situation will occur if the boundary marker output is present without a column pulse one output.

The interconnection of the above described components will now be described in detail with reference to Figure 7. In this figure the brushes 34 are diagrammatically illustrated as being engageable with the previously mentioned conductive roller 35. Depending on the particular design of the card reader and punch, there will be a certain time factor involved as the cards move through that apparatus. For purposes of illustration, it will be assumed that the motor 43 (Fig. 3) drives the reader and punch at such speed that the brushes 34 are able to be in contact with the conductive roller 35 (whenever apertures are present) for about 40 milliseconds. The arrangement is such that the previously mentioned brush 48 of the card reader-punch (Fig. 3) is connected to energize a relay coil 204 to operate a relay arm 206 so that a positive potential is applied to the conductive roller 35. The segments 46 of disc 45 which brush 48 contacts will each be of such length in relation to the speed of rotation of disc 45 that the relay arm 206 remains operated for only a portion of the 40 milliseconds mentioned above, for example, about 8 milliseconds.

Each of the brushes 34 is connected to feed one of eighty diode networks 208, these networks being normally biased so that no output will be produced on output lines 210, if no contact is made through brushes 34 to roller 35. Each of the diode networks 208 has two input sources, one being an electrical signal resulting from a brush contact through a card aperture and the other input being a particular column pulse from the column pulse distributor. The bias on each network is such that a column pulse alone will not produce an output pulse. In Figure 7, lines 212 are designated by legend as being connected with the output lines ($C_1$–$C_{80}$) of the column pulse distributor. Accordingly, it will be understood that there are eighty of the lines 212, each of which feeds one of the diode networks 208. Therefore, as the column pulse distributor applies enabling pulses to the lines 212, beginning with $C_{80}$, and proceeding toward $C_1$, an output pulse will appear on a respective line 210 for each of the brushes 34 which contact roller 35 while a given row of a card is beneath the brushes 34, there being no output pulse for brushes which do not engage the roller 35. This results in the probing or sampling of each brush in sequence.

The output pulses of the diode networks 208 are collected in groups of ten by additional diode networks 214. The collection into groups of ten is simply to minimize loading of the other diode networks 208. The collected outputs of the diode networks 214 are then connected to a common output line 216 and this line is then connected as the first enable of a gate 218. At such times as pulses are to pass gate 218, a card handling enabling signal will be applied over a line 219 to act as the second enable of gate 218.

From the foregoing description, it will be clear that a card will move into the card reader 10 (at a command signal described below) and at a predetermined moment after the beginning of the feeding of the card, the first or 12's row of the card appears adjacent the brushes 34. During the period when the brushes are at the apertures of the 12's row, the relay 204 will be energized by reason of commutator disc 45 to apply the above mentioned positive potential to roller 35 for the above mentioned eight millisecond period. The potential on roller 35 will also be applied over a line 217 to trigger a timed single pulse generator 220. The application of the potential on line 217 to generator 220 will be delayed by circuit 217' for a short interval, to permit the segment 47 of Figure 3 to engage one of the brushes 49, for reasons which will become apparent hereinbelow.

The function of pulse generator 220 is to produce one and only one pulse coinciding with a timing pulse each time the positive enabling potential appears on roller 35. That is, after the potential appears on line 217, the next timing pulse incoming on a line 221 from the reading amplifier 124b (Fig. 5) will be "passed" through circuit 220 and will appear on an output line 242. However, no additional timing pulse will pass circuit 220 until the potential on roller 35 has been removed and reapplied.

A suitable circuit for the pulse generator 220 may be understood with reference to Figure 7A. In this figure, timing pulses are applied through lead 221. Another lead designated 222 is arranged to normally be at substantially ground potential and is arranged to be connected to the roller 35 via line 217 and delay circuit 217' to receive the positive potential applied to roller 35. The positive potential on line 222 raises the potential on a grid 223 of a gas tube 224 of a slow recovery relaxation oscillator circuit designated generally as 225. This causes a discharge through the tube 224 which cycles oscillator 225. Cycling of the oscillator produces a negative pulse which is shortened in the circuit designated generally as 226. The resulting negative pulse sets flip-flop 227 which enables gate 228. The first timing pulse to appear on lead 221 after this gate is enabled results in a pulse on lead 229 which sets flip-flop 230. This results in the enabling of gate 231. The next timing pulse on lead 221 passes through gate 231 and appears on lead 232. The two sets of flip-flops and gates are used here because it might be possible for gate 228 alone to transmit a timing pulse of sub-standard size in the event of inexact or close coincidence between the enabling of gate 228 and the occurrence of a timing pulse on lead 221. It will be evident that only a pulse of full size can be transmitted through the gate 231.

The resulting pulse from gate 231 is then amplified in the circuit of tube 233 and by means of a pulse transformer 234 the pulse is made available as a positive pulse on an output line 235. The portion of the circuit designated generally as 236 is arranged to produce a single pulse which is delayed by less than one-half of a timing pulse period for resetting flip-flops 227 and 230.

The time constants of the grid and anode circuits of gas tube 224 are selected so that the gas tube 224 is fired upon the initial appearance of the potential on roller 35 (Fig. 7) and cannot be fired again until after a suitable time has elapsed, this time period being arranged to exceed the eight millisecond period during which the positive potential will be available at roller 35.

Referring again to Figure 7, pulse generator 220 will be provided, via line 221, with a series of timing pulses from the previously mentioned track 122 of the magnetic drum (Fig. 5). Accordingly, for every discrete enabling signal on line 222, only one of the timing pulses will be permitted to pass to the output line 242. In the manner just described, if a row of apertures is beneath the brushes 34 and relay 204 is energized, the second timing marker pulse occurring after the inception of the resulting delayed enabling signal on line 222 will give rise to a simultaneous pulse on line 242.

The pulse on line 242 will be applied to a revolver control element 244 to place a marker pulse in this revolver element. Because this revolver track is on the same drum as the timing tracks, the just written marker pulse will be aligned with one of the timing spots on track 122. The pulse on line 242 will also be applied over branch lines 242' to enable each of a group of twelve gates 246(a)–256(l).

The gates 246(a)–(l) are each otherwise provided with a second enable connected to a respective one of the previously mentioned brushes 49 (Fig. 3) associated with the card reader-punch disc 45. Therefore, when the 12's row of the card is under the brushes 34, the first of a group of lines 245(a)–(l) connected to the brushes 49 will enable gate 246(a). Subsequently, when the 11th row, 10th row, etc., pass beneath the brushes 34, successive ones of the lines 245(b)–(l) will be energized to enable the remaining ones of the gates 246(b)–(l), in turn.

Assuming that the 12's row of the card is under the brushes, gate 246(a) will be enabled to pass a single timing pulse on its line 242', and this pulse will be applied over line 248(a) to cause a flip-flop circuit 250(a) to "flip" and provide a relatively positive energizing potential on an output line 252(a).

The energizing potential on line 252(a) will serve to provide the first enable over branch line 254(a) to a revolver input gate 256(a), and to also provide an enable signal over branch line 258(a) to a revolver output gate 260(a). The just-mentioned revolver gates are associated with the first of a set of twelve revolver elements 262(a)–262(l) which are identifiable with the twelve rows of the cards. It will be understood that various numbers of revolver elements may be employed, according to the particular type of card employed, within the scope of the present invention.

Inasmuch as the line 252(a) is enabled by an output line of the flip-flop 250(a), the enabling signal will remain available on line 252 until flip-flop 250(a) is reset. Accordingly, the gates 256(a) and 260(a) will remain open.

The result of the gate 256(a) being enabled is that the series of pulses available on previously mentioned line 216 will pass through the gate 218 (when enabled) and through an amplifying and shaping circuit 263 and then through gate 256(a) to be recorded in the drum track associated with revolver element 262(a). At the time, the result of gate 260(a) being enabled is that previously recorded flux spots of the revolver element 262(a) will be read and a series of output pulses will pass through gate 260(a) and will appear on a line 264 leading to the staticizer circuits.

By the time that the leading flux spot (or cell reserved for a non-existent spot) representing the first brush 34 has reached the reading head of the revolver element 262(a), the timed single timing marker pulse which was available on line 242 and was recorded in revolver control element 244 will have reached the reading head of the latter, and the resultant pulse will be available on a line 266. Line 266 is connected as a reset line to the flip-flops 250(a)–250(l). Accordingly, the pulse on line 266 will reset the flip-flop 250(a) to remove the enabling potential from line 252(a) and to establish a similar enabling potential on the second output line 268(a) of the flip-flop 250(a). The line 268(a) is connected to provide an enable to a recirculation gate 278(a) and the opening of this gate will permit data read by the reading head of revolver element 262(a) to recirculate through gate 278(a) and back to the writing head of this revolver element. At the same moment that gate 278(a) is opened, the removal of the enabling potential on line 252(a) will close the input and output gates 256(a) and 260(a), leaving the recorded data to "revolve" in the revolver element 262(a). It should be noted that the final pulse of each group, i. e. that gated through diode networks 208 by distributor pulse C₁, will always be recorded in alignment with one of the boundary marker pulses of track 122. However, each time this "C₁" pulse is thereafter re-recorded, it will "drop back" on the drum surface by one boundary marker.

Shortly after the final pulse, if any, or the cell reserved for the final pulse, resulting from the probing of the first index point (reading from left to right in Figure 1) in the 12's row of the card has been recorded, the card reader-punch motor 43 (Fig. 3) will have revolved the disc 45 sufficiently to have advanced the 11's row of the card beneath the reading brushes. The result of this is that the gate 246(a) will be now closed and the next gate 246(b) will be opened, resulting in the setting of the second flip-flop circuit 250(b). The second revolver element 262(b) will then be loaded in a manner entirely analogous to the loading of revolver element 262(a). Accordingly, as the reading of the card continues, eventually the 12th revolver element 262(l) will be loaded and the complete card will have been transferred into magnetic form. The "card" will now be continuously available in revolving status on the magnetizable surface of the drum and in such form is obviously adapted for very rapid access, much more rapid than is possible when the card is in punched form.

It will be understood that the card columns are aligned across the revolver elements 262(a)–(l). That is, the flux spots representative of any given index point, such as index point 10, for example, will appear in the same relative position in each of the twelve revolver element tracks 262(a)–(l). As will be more fully apparent below, it is desirable to have the flux spots so aligned because it may be desired to remove corresponding "bits" of the information simultaneously or in "parallel" from all of the revolver elements.

The reason that the flux spots are aligned is as follows: Whatever timing pulse is transmitted through circuit 220 to load revolver element 262(a) will be related to and identifiable with a particular column pulse. This might be taken at random, but in the present example is, as described previously, always pulse C₁. The "leading" spot in revolver 262(a) will then (due to "rise time" and so forth) be the next or C₈₀ spot, and the revolver will continue to load until all of the spots C₈₀ to C₁ are taken care of. Similarly, when the next card row is subjected to scansion, the C₈₀ pulse again starts the scan and the C₈₀ pulse, if any, in this track, will be recorded in alignment with C₈₀ spot in the preceding revolver track.

While the alignment of the flux spots between the respective revolvers may most conveniently be thought of in terms of physical alignment—in lines parallel to the axis of the drum—nevertheless, even if the various revolver elements are staggered about the periphery of the drum, electrically the data will be recorded in and read from the revolver tracks at the same time. Therefore, the flux spots may be considered to be in "electrical" alignment even if they are not in physical alignment.

It will furthermore be observed that each revolver element may operate in a separate track of the drum surface or they may all operate in the same track. In the latter case, each element will be at a discrete position about the circumference of the drum. In either case, electrical alignment exists.

After the complete revolver has been loaded, the information may be removed from all of the tracks simultaneousy and forwarded to the data and processing equipment. In fact, the information in the revolver elements may be tapped at any time and this will not interfere with or tend to erase the information which is circulating. The tapping-off of information from the revolver elements may be through gates 280(a)–280(l) having a second enable via lines 281(a)–281(l) from any convenient point in the data processing equipment or other control point.

In removing information from the revolver tracks, it has been pointed out above that this data will be available on line 264 whenever any one of the revolver output gates 260(a)–(l) is opened. The data on line 264 will first pass through a gate 282, which is enabled over a line 284 from any suitable annexed control circuits (not shown) arranged to produce a continuous card handling enable potential whenever the revolver is to be loaded and unloaded. The pulses available through gate 282 will first be received from the revolver element 262(a), then 262(b) and so forth, in sequence. The sequential unloading comes about because of the sequential enabling of the previously mentioned flip-flop 250(a)–(l) and the previously mentioned lines 252(a)–(l) and 258(a)–(l).

The pulses passing through gate 282 are first amplified and shaped in circuit 286 and are then made available on a bus 288 which is, in turn, connected to the second grid 290 of each of eighty thyratron circuit stages 292. Accordingly, each time a pulse appears on bus 288, all eighty of the grids 290 will be simultaneously enabled. However, the first grids 294 of the thyratron stages 292 will be individually controlled by the column pulse distributor. Therefore, as will be apparent from the foregoing, the solenoid coils 296 of each of the punches of the card punch will be energized (or not energized if no aperture is to appear at the index point involved) as the thyratron stages 292 are completely energized in sequence. The thyratrons may be readily "cleared" by momentarily removing the source of anode potential following the punching of each row in the cards. Means for so clearing the circuit is obvious and therefore not shown.

It is also possible to have information delivered from data processing equipment or other source into the revolver elements 262(a)–(l). This is under control of a line 300 from any suitable control circuit on which may be caused to exist an enabling potential to enable gates 302(a)–(l). The incoming signals for loading the revolver elements 262(a)–262(l) will be available over line 304 from the data processing equipment. Gates 302(a)–(l) each have as a third input or enable a connection from a respective one of the lines 252(a)–(l). Thus the information from the data processing equipment may be entered into the revolver elements 262(a)–(l) in turn, but only at times when the recirculation path of the respective revolver element is opened.

The end of a card handling cycle may be automatically indicated by use of a gate 306. This gate has one enable from the output of revolver control element 244 and a second enable connected with output line 252(l) of flip-flop circuit 250(l). Accordingly, the marker pulse read from the revolver 244 indicating the loading of the last row of the card will permit a pulse signifying this event to be available over a control line 308. This pulse may be employed in any convenient manner to control the card reader and punch and other associated equipment.

From the foregoing, it will be apparent that the present invention provides apparatus for readily converting data on record cards into magnetic flux form for rapid handling in computing and like machinery. Since the invention may take many forms, the above detailed description is given only for purposes of illustration, and it is not intended that the invention be limited thereto. On the contrary, the true scope of the invention is to be indicated by the appended claims.

We claim:
1. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate sequentially a series of signals representative of configurations detected along said rows, a movable member comprising a magnetizable surface, means for moving the movable member, transducing means positioned in operative relationship to the magnetizable surface, the transducing means comprising at least one recording means, and means interconnecting the probing means and said recording transducing means for recording pulses representing sensed configurations as a series of flux cells along a track in the magnetizable surface.

2. Data conversion apparatus comprising, means for sensing record cards to detect data indicating apertures, the sensing means comprising a plurality of sensing devices positioned in a row to sense a row of apertures along a card, electrical probing means for serially sampling the sensing devices to generate sequentially a series of signals representative of apertures detected along said rows, a movable member comprising a magnetizable surface, means for moving the movable member in cycles of travel, transducing means positioned in operative relationship to the magnetizable surface, the transducing means comprising at least one recording means, and means interconnecting the probing means and said recording transducing means for recording pulses representing sensed apertures as a series of flux cells along a track of the magnetizable surface.

3. Data conversion apparatus comprising, means for sensing record cards to detect data indicating apertures, the sensing means comprising a plurality of sensing devices positioned in a row to sense a row of apertures along a card, electrical probing means for serially sampling the sensing devices to generate sequentially a series of signals representative of apertures detected along said rows, a movable member comprising a magnetizable surface, means for moving the movable member in cycles of travel, transducing means positioned in operative relationship to the magnetizable surface, the transducing means comprising at least one recording means and at least one reproducing means spaced apart a predetermined distance in a line parallel to the direction of travel of the magnetizable surface of the movable member, means interconnecting the probing means and said recording transducing means for recording pulses representing sensed apertures as a series of flux cells along a track of the magnetizable surface, and recirculation means interconnecting the reproducing means with the recording means.

4. Apparatus as in claim 3 including a plurality of the units of spaced-apart recording and reproducing transducer means, and the means interconnecting the probing means and the recording means of each unit including switching means for selectively directing data detected in the respective rows of the record cards to separate ones of said units for recording therein.

5. Apparatus as in claim 4 wherein the probing means includes means for generating pulses in synchronism with the movement of the movable member, the arrangement being such that electrical alignment of data recorded on the magnetizable surface by the recording transducer means of each of said units is established.

6. Apparatus as in claim 5 in which each transducing unit operates in the same track along the magnetizable surface.

7. Apparatus as in claim 5 in which each transducing unit operates in discrete tracks along the magnetizable surface.

8. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate sequentially a series of signals representative of configurations detected along said rows, a movable member comprising a magnetizable surface, means for moving the movable member in cycles of travel, transducing means positioned in operative relationship to the magnetizable surface, the transducing means comprising at least one recording means and at least one reproducing means spaced apart a predetermined distance in a line parallel to the direction of travel of the magnetizable surface of the movable member, means interconnecting the probing means and said recording transducing means for recording pulses representing sensed configurations as a series of flux cells along a track of the magnetizable surface, and recirculating means interconnecting the reproducing means with the recording means.

9. Apparatus as in claim 8 including a plurality of the units of spaced-apart recording and reproducing transducer means, the means interconnecting the probing means and the recording means of each unit including switching means for selectively directing data detected in the respective rows of the record cards to separate ones of said units for recording therein.

10. Apparatus as in claim 9 wherein the probing means includes means for generating pulses in synchronism with the movement of the movable member, the arrangement being such that electrical alignment of data recorded on the magnetizable surface by the recording transducer means of each of said units is established.

11. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate sequentially a series of signals representative of configurations detected along said rows, the probing means including gating networks and pulse generating and distributing means for applying probing pulses to the gating networks in sequence, a movable member comprising a magnetizable surface, means for moving the movable member in cycles of travel, transducing means positioned in operative relationship to the magnetizable surface, the transducing means comprising at least one recording means, and means interconnecting said gating networks of the probing means and said recording transducing means for recording pulses representing sensed configurations as a series of flux cells along a track of the magnetizable surface.

12. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate sequentially a series of signals representative of configurations detected along said rows, the probing means including gating networks and pulse generating and distributing means for applying probing pulses to the gating networks in sequence, a movable member comprising a magnetizable surface, means for moving the movable member in cycles of travel, transducing means positioned in operative relationship to the magnetizable surface, the transducing means comprising at least one recording means and at least one reproducing means spaced apart a predetermined distance in a line parallel to the direction of travel of the magnetizable surface of the movable member, means interconnecting said gating networks of the probing means and said recording transducing means for recording pulses representing sensed configurations as a series of flux cells along a track of the magnetizable surface, and recirculation means interconnecting the reproducing means with the recording means.

13. Apparatus as in claim 12 including a plurality of the units of spaced-apart recording and reproducing transducer means, and the means interconnecting said gating networks of the probing means and the recording means of each unit including switching means for selectively directing data detected in the respective rows of the record cards to separate ones of said units for recording therein.

14. Apparatus as in claim 13 wherein the probing means includes means for generating pulses in synchronism with the movement of the movable member, the arrangement being such that electrical alignment of data recorded on the magnetizable surface by the recording transducer means of each of said units is established.

15. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate sequentially a series of signals representative of configurations detected along said rows, the probing means including gating networks and pulse generating and distributing means for applying probing pulses to the gating networks in sequence, said networks being otherwise enabled by connection to the sensing devices, a movable member comprising a magnetizable surface, means for moving the movable member in cycles of travel, transducing means positioned in operative relationship to the magnetizable surface, the transducing means comprising at least one recording means, and means interconnecting said gating networks of the probing means and said recording transducing means for recording pulses representing sensed configurations as a series of flux cells along a track of the magnetizable surface.

16. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate sequentially a series of signals representative of configurations detected along said rows, a movable member comprising a magnetizable surface, means for moving the movable member, transducing means positioned in operative relationship to the magnetizable surface, the transducing means comprising recording means and reproducing means, means interconnecting the probing means and said recording transducing means for recording pulses representing sensed configurations as a series of flux cells along a track of the magnetizable surface, means for establishing data indicating configurations in record cards, and means interconnecting the data establishing means with said reproducing transducer means.

17. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate sequentially a series of signals representative of configurations detected along said rows, a movable member comprising a magnetizable surface, means for moving the movable member, transducing means positioned in operative relationship to the magnetizable surface, the transducing means comprising at least one recording means and at least one reproducing means, the reproducing means being spaced from the recording means a predetermined distance in the direction of travel of the movable member, means interconnecting the probing means and said recording transducing means for recording pulses representing sensed configurations as a series of flux cells along a track of the magnetizable surface, a recirculation circuit interconnected between said reproducing and recording transducing means, means for establishing data indicating configurations in record cards, and means interconnecting the data establishing means with said reproducing transducer means.

18. Apparatus as in claim 17 including a plurality of the units of spaced-apart recording and reproducing transducer means, and the means interconnecting the probing means and the recording means of each unit including switching means for selectively directing data detected in the respective rows of the record cards to separate ones of said units for recording therein.

19. Apparatus as in claim 18 wherein the probing means includes means for generating pulses in synchronism with the movement of the movable member, the arrangement being such that electrical alignment of data recorded on the magnetizable surface by the recording transducer means of each of said units is established.

20. Data conversion apparatus comprising, means for sensing record cards to detect data indicating configurations existing thereon, the sensing means comprising a plurality of sensing devices positioned in a row to sense a row of configurations along a card, electrical probing means for serially sampling the sensing devices to generate a series of signals representative of configurations detected along said rows, the probing means including gating networks and pulse generating and distributing means for applying probing pulses to the gating networks in sequence, said networks being otherwise enabled by connection to the sensing devices, a movable member comprising a magnetizable surface, means for moving the movable member in cycles of travel, transducing means positioned in operative relationship to the magnetizable surface, the transducing means comprising at least one recording means and at least one reproducing means spaced apart a predetermined distance in a line parallel to the direction of travel of the magnetizable surface of the movable member, means interconnecting said gating networks of the probing means and said recording transducing means for recording pulses representing sensed configurations as a series of flux cells along a track of the magnetizable surface, a recirculation circuit interconnected between said reproducing and recording transducing means, means in the recirculation circuit for tapping off data being circulated, means for establishing data indicating configurations in record cards, and means interconnecting the data establishing means with said reproducing transducer means.

21. Apparatus as in claim 20 and further including means for entering data into and removing data from the recirculation path to and from terminals separate from the configuration detecting and establishing means.

22. Apparatus as in claim 20 including a plurality of the units of spaced-apart recording and reproducing transducer means, and the means interconnecting said gating networks of the probing means and the recording means of each unit including switching means for selectively directing data detected in the respective rows of the record cards to separate ones of said units for recording therein.

23. Apparatus as in claim 22 and further including means for simultaneously entering data into and removing data from the recirculation paths of each of said units.

24. Apparatus as in claim 22 wherein the probing means includes means for generating pulses in synchronism with the movement of the movable member, the arrangement being such that electrical alignment of data recorded on the magnetizable surface by the recording transducer means of each of said units is established.

25. Data conversion apparatus comprising, means for sensing a row of possible apertures in a record card including a plurality of feeler brushes, each arranged to receive a potential when an aperture appears in the card beneath this brush, a corresponding plurality of dual input gating circuits, each having one input connected to a respective brush so that the potential receivable therefrom serves as a first enabling signal, a second source of enabling signals for the gating circuits and including sequential signal generating means for sweeping the second inputs of the gating circuits to enable said circuits, in sequence, the arrangement being such that only the simultaneous application of both enabling signals to any gating circuit will produce an output therefrom, a movable member having a magnetizable surface, means for moving the movable member in cycles of travel, a plurality of transducing units positioned in operative relationship to the magnetizable surface, one unit for each row of card apertures to be sensed and each unit comprising a recording means arranged to operate in a track along the magnetizable surface, means for moving record cards beneath the feeler brushes so that one row after another of aligned apertures may be sensed, and means including switching means operatively connected with the card moving means for connecting the series of gating circuit outputs to the recording transducer means of different units in sequence, whereby a replica of the apertures in each row of the record card is established in the track of the magnetizable surface passing the corresponding recording transducer means.

26. Apparatus as in claim 25 wherein each transducing unit also includes a reproducing means spaced a predetermined distance from the associated recording means in a direction parallel to the movement of the magnetizable surface and the recording and reproducing means of each unit are arranged to operate in the same track along the magnetizable surface, and further including a plurality of record card aperturing means and means connected with the reproducing transducer means of each unit for enabling predetermined ones of said record card aperturing means in dependence upon the occurrence of flux cells representative of data signals passing the reproducing transducer means.

27. Apparatus as in claim 26 wherein the means for enabling the aperturing means comprises a plurality of dual input gas discharge devices, each having as a first input the connection with the reproducing transducer means and as a second input a connection with said sequential signal generating means.

28. Apparatus as in claim 25 wherein each transducing unit also includes a reproducing means spaced a predetermined distance from the associated recording means in a direction parallel to the movement of the magnetizable surface and arranged to operate in the same track along the magnetizable surface as the associated recording means, recirculation means interconnecting the reproducing means and the recording means, and erasing means for erasing the data passing the reproducing means.

29. Apparatus as in claim 28 and further including means in each recirculation path for tapping off data in such paths.

30. Apparatus as in claim 28 and further including a plurality of record card aperturing means and means connected with the reproducing transducer means of each unit for enabling predetermined ones of said record card aperturing means in dependence upon the occurrence of flux cells representative of data signals passing the reproducing transducer means.

31. Apparatus as in claim 30 wherein the means for enabling the aperturing means comprises a plurality of dual input gas discharge devices, each having as a first input the connection with the reproducing transducer means and as a second input a connection with said sequential signal generating means.

32. Data conversion apparatus comprising, means for sensing record media to detect data indicating configurations existing thereon, including a plurality of sensing devices positioned in a row to sense a row of configurations along a medium, and for producing simultaneous energy manifestations in response to data indicating configurations sensed in each row, means connected to said first-mentioned means for generating sequentially a series of signals representative of the energy manifestations produced in response to the configurations detected along each row, a movable member comprising a magnetizable surface, means for moving the movable member, transducing means positioned in operative relationship to the magnetizable surface, the transducing means comprising at least one recording means, and means interconnecting the generating means and said recording transducing means for recording pulses representing sensed configurations as a series of flux cells along a track in the magnetizable surface.

References Cited in the file of this patent

UNITED STATES PATENTS

| | | |
|---|---|---|
| 2,377,762 | Daly | June 5, 1945 |
| 2,484,114 | Page et al. | Oct. 11, 1949 |
| 2,540,654 | Cohen et al. | Feb. 6, 1951 |